US012158152B2

(12) United States Patent
Ohtachi et al.

(10) Patent No.: US 12,158,152 B2
(45) Date of Patent: Dec. 3, 2024

(54) VACUUM PUMP AND STATOR COMPONENT OF THREAD GROOVE PUMP PORTION OF THE VACUUM PUMP

(71) Applicant: Edwards Japan Limited, Chiba (JP)

(72) Inventors: Yoshinobu Ohtachi, Chiba (JP); Yasushi Maejima, Chiba (JP); Tsutomu Takaada, Chiba (JP); Toshiki Yamaguchi, Chiba (JP)

(73) Assignee: Edwards Japan Limited, Chiba (JP)

( * ) Notice: Subject to any disclaimer, the term of this patent is extended or adjusted under 35 U.S.C. 154(b) by 116 days.

(21) Appl. No.: 17/609,626

(22) PCT Filed: May 12, 2020

(86) PCT No.: PCT/JP2020/019034
§ 371 (c)(1),
(2) Date: Nov. 8, 2021

(87) PCT Pub. No.: WO2020/230799
PCT Pub. Date: Nov. 19, 2020

(65) Prior Publication Data
US 2022/0235776 A1 Jul. 28, 2022

(30) Foreign Application Priority Data
May 15, 2019 (JP) ................................ 2019-092143

(51) Int. Cl.
*F04D 19/04* (2006.01)
*F04D 29/52* (2006.01)

(52) U.S. Cl.
CPC ......... *F04D 19/042* (2013.01); *F04D 19/044* (2013.01); *F04D 29/522* (2013.01); *F05D 2260/607* (2013.01)

(58) Field of Classification Search
None
See application file for complete search history.

(56) References Cited

U.S. PATENT DOCUMENTS 3,832,084 A * 8/1974 Maurice .................. F04D 19/04 417/423.4
4,645,413 A * 2/1987 Reich .................... F04D 19/042 415/72
(Continued)

FOREIGN PATENT DOCUMENTS

FR 3118651 A1 * 7/2022
JP H11329465 A 11/1999
(Continued)

OTHER PUBLICATIONS

Machine Translation of JP-4197819-B2 (Obtained from USPTO Search Copyright 2023 Clarivate Analytics) (Year: 2023).*
(Continued)

*Primary Examiner* — Dominick L Plakkoottam
*Assistant Examiner* — Geoffrey S Lee
(74) *Attorney, Agent, or Firm* — Theodore M. Magee; Westman, Champlin & Koehler, P.A.

(57) ABSTRACT

Provided is a vacuum pump suitable for preventing the backflow of a particle from the vacuum pump toward a vacuum chamber. The vacuum pump includes a turbomolecular pump portion exhausting gas molecules by a rotor blade and a stator blade, and a thread groove pump portion provided downstream of the turbomolecular pump portion and exhausting the gas molecules by a thread groove flow path formed by a cylindrical rotary component (cylindrical portion) and a cylindrical stator component (thread groove pump portion stator) provided on an outer periphery of the cylindrical rotary component, wherein a bounce back prevention means for preventing a particle from bouncing from the thread groove pump portion back toward the turbomolecular pump portion is provided downstream of the turbomolecular pump portion.

6 Claims, 7 Drawing Sheets

(56) References Cited

U.S. PATENT DOCUMENTS

| | | | | |
|---|---|---|---|---|
| 5,695,316 | A * | 12/1997 | Schutz | F04D 23/008 417/423.4 |
| 2015/0240829 | A1 * | 8/2015 | Ohtachi | F04D 29/058 416/175 |
| 2018/0283386 | A1 * | 10/2018 | Kuno | F04D 29/644 |
| 2018/0363662 | A1 * | 12/2018 | Kabasawa | F04D 29/324 |

FOREIGN PATENT DOCUMENTS

| | | | | |
|---|---|---|---|---|
| JP | 2004076708 | A | 3/2004 | |
| JP | 2006013256 | A | 1/2006 | |
| JP | 2006144590 | A | 6/2006 | |
| JP | 4197819 | B2 * | 12/2008 | F04D 19/042 |
| JP | 2016017454 | A | 2/2016 | |
| JP | 2018047036 | A | 3/2018 | |
| JP | 2018178733 | A | 11/2018 | |
| WO | 2009153874 | A1 | 12/2009 | |
| WO | 2011070856 | A1 | 6/2011 | |

OTHER PUBLICATIONS

Machine Translation of FR-3118651 (Obtained from USPTO Search Copyright 2023 Clarivate Analytics) (Year: 2023).*
PCT International Search Report dated Jul. 28, 2020 for corresponding PCT application Serial No. PCT/JP2020/019034, 2 pages.
PCT International Written Opinion dated Jul. 28, 2020 for corresponding PCT application Serial No. PCT/JP2020/019034, 4 pages.
Jis B 0601, p. 1167 (1994).

* cited by examiner

VACUUM PUMP AND STATOR COMPONENT OF THREAD GROOVE PUMP PORTION OF THE VACUUM PUMP

CROSS-REFERENCE OF RELATED APPLICATION

This application is a Section 371 National Stage Application of International Application No. PCT/JP2020/019034, filed May 12, 2020, which is incorporated by reference in its entirety and published as WO 2020/230799A1 on Nov. 19, 2020 and which claims priority of Japanese Application No. 2019-092143, filed May 15, 2019.

BACKGROUND

The present invention relates to a vacuum pump used as a gas exhaust means for a process chamber of a semiconductor manufacturing processing apparatus, a flat panel display manufacturing apparatus, and a solar panel manufacturing apparatus and other vacuum chambers, and a stator component of a thread groove pump portion of the vacuum pump. The present invention is particularly suitable for preventing a backflow of a particle from the vacuum pump toward the vacuum chamber.

Vacuum pumps such as turbomolecular pumps and thread groove pumps are heavily used for exhausting vacuum chambers required to create a high vacuum. FIG. 7 is a schematic view of an exhaust system that employs a conventional vacuum pump as the gas exhaust means of a vacuum chamber.

A vacuum pump Z of prior art that constitutes the exhaust system of FIG. 7 includes a turbomolecular pump portion PT between an inlet port 2 and an outlet port 3, and a thread groove pump portion PS downstream of the turbomolecular pump portion PT. The turbomolecular pump portion PT of the vacuum pump Z of prior art includes a plurality of rotor blades 7 and stator blades 8 that are radially arranged at predetermined intervals in each of exhaust stages PT1, PTn, wherein gas molecules are exhausted by the rotor blades 7 and the stator blades 8.

Incidentally, in the exhaust system of FIG. 7, a particle may fall from a vacuum chamber CH side or a pressure adjusting valve BL side toward the vacuum pump Z by their own weight. The particle that falls in this manner passes through a structural gap in the turbomolecular pump portion PT and eventually collides with an upper surface of a thread groove pump portion stator 9 (stator component) and bounces back from the thread groove pump portion PS toward the turbomolecular pump portion PT. Then, in the exhaust system of FIG. 7, some of the particle Pa that has scattered by bouncing may flow back toward the vacuum chamber CH through the structural gap of the turbomolecular pump portion PT or the inlet port 2.

There has conventionally existed a means for reducing the number of particles flowing back toward the vacuum chamber CH by controlling the bouncing direction of the particle described above. Specifically, an upper surface 9A of the stator component of the thread groove pump portion PS (specifically, the thread groove pump portion stator 9 that forms a thread groove flow path R for exhausting the gas molecules by facing a cylindrical rotary component 6) is tilted (see the description of paragraph 0019 of Japanese Patent No. 6414401).

However, the particle may be sufficiently small relative to the surface roughness of the upper surface 9A of the thread groove pump portion stator (stator component), such as when the size of the particle is $10^{-3}$ times that of the height difference of the unevenness caused by the surface roughness of the upper surface 9A. In this case, the particle that collides with the upper surface 9A of the thread groove pump portion stator (stator component) is irregularly reflected. Therefore, in the conventional configuration in which the upper surface 9A of the thread groove pump portion stator (stator component) is tilted as described above, the bouncing direction of the particle on the upper surface 9A of the thread groove pump portion stator (stator component) cannot be controlled sufficiently, and the number of particles flowing back toward the vacuum chamber CH cannot be reduced effectively.

The discussion above is merely provided for general background information and is not intended to be used as an aid in determining the scope of the claimed subject matter. The claimed subject matter is not limited to implementations that solve any or all disadvantages noted in the background.

SUMMARY

The present invention was contrived in order to solve the foregoing problems, and an object thereof is to provide a vacuum pump suitable for preventing the backflow of the particle from the vacuum pump toward the vacuum chamber.

In order to achieve the foregoing object, the present invention provides a vacuum pump that include a turbomolecular pump portion exhausting gas molecules by a rotor blade and a stator blade, and a thread groove pump portion provided downstream of the turbomolecular pump portion and exhausting the gas molecules by a thread groove flow path formed by a cylindrical rotary component and a cylindrical stator component provided on an outer periphery of the cylindrical rotary component, wherein a bounce back prevention means for preventing a particle from bouncing from the thread groove pump portion back toward the turbomolecular pump portion is provided downstream of the turbomolecular pump portion.

In the present invention, the bounce back prevention means may be characterized in that an upper surface of the stator component that faces the turbomolecular pump portion is inclined and smooth.

In the present invention, the bounce back prevention means may be structured to include a recess portion in an upper portion of the stator component that faces the turbomolecular pump portion.

In the present invention, the recess portion may be shaped to penetrate the stator component and connected to a particle trapping space.

In the present invention, the recess portion may be positioned near immediately below a gap provided on an outer end side of the rotor blade.

In the present invention, the recess portion may include a smooth surface in at least a part of a surface of the recess portion.

The present invention also provides a stator component of a thread groove pump portion of a vacuum pump, the stator component being provided downstream of a turbomolecular pump portion exhausting gas molecules by a rotor blade and a stator blade, and forming a thread groove flow path with a cylindrical rotary component to exhaust the gas molecules, wherein the stator component includes a bounce back prevention means for preventing a particle from bouncing from the thread groove pump portion back toward the turbomolecular pump portion.

In the present invention, the term "bounce back" means that the particle collides with something and bounce. The term "immediately below the gap" means not only "directly below" the gap but also "immediately below" the gap. The same is true for the foregoing embodiments.

According to the present invention, the bounce back prevention means prevents the particle from bouncing from the thread groove pump portion toward the turbomolecular pump portion. Thus, the present invention can provide a vacuum pump that is suitable for preventing the backflow of the particle from the vacuum pump toward a vacuum chamber in terms of reducing the percentage of the bouncing particle flowing back toward the vacuum chamber upstream of the vacuum pump.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION

The best mode for carrying out the present invention is now described hereinafter in detail with reference to the accompanying drawings.

Figure 1:
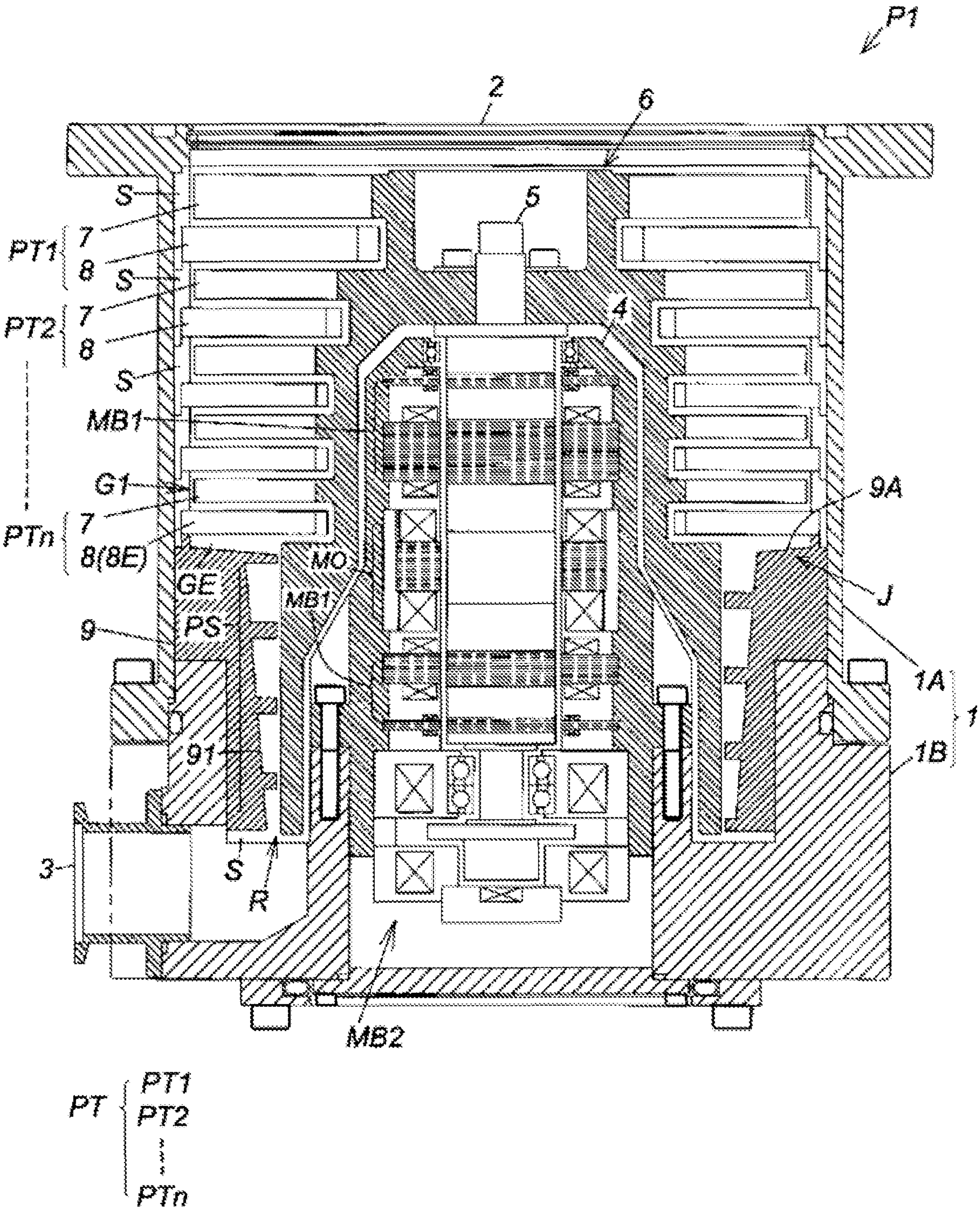
FIG. 1 is a cross-sectional view of a vacuum pump to which the present invention is applied.
Figure 2:
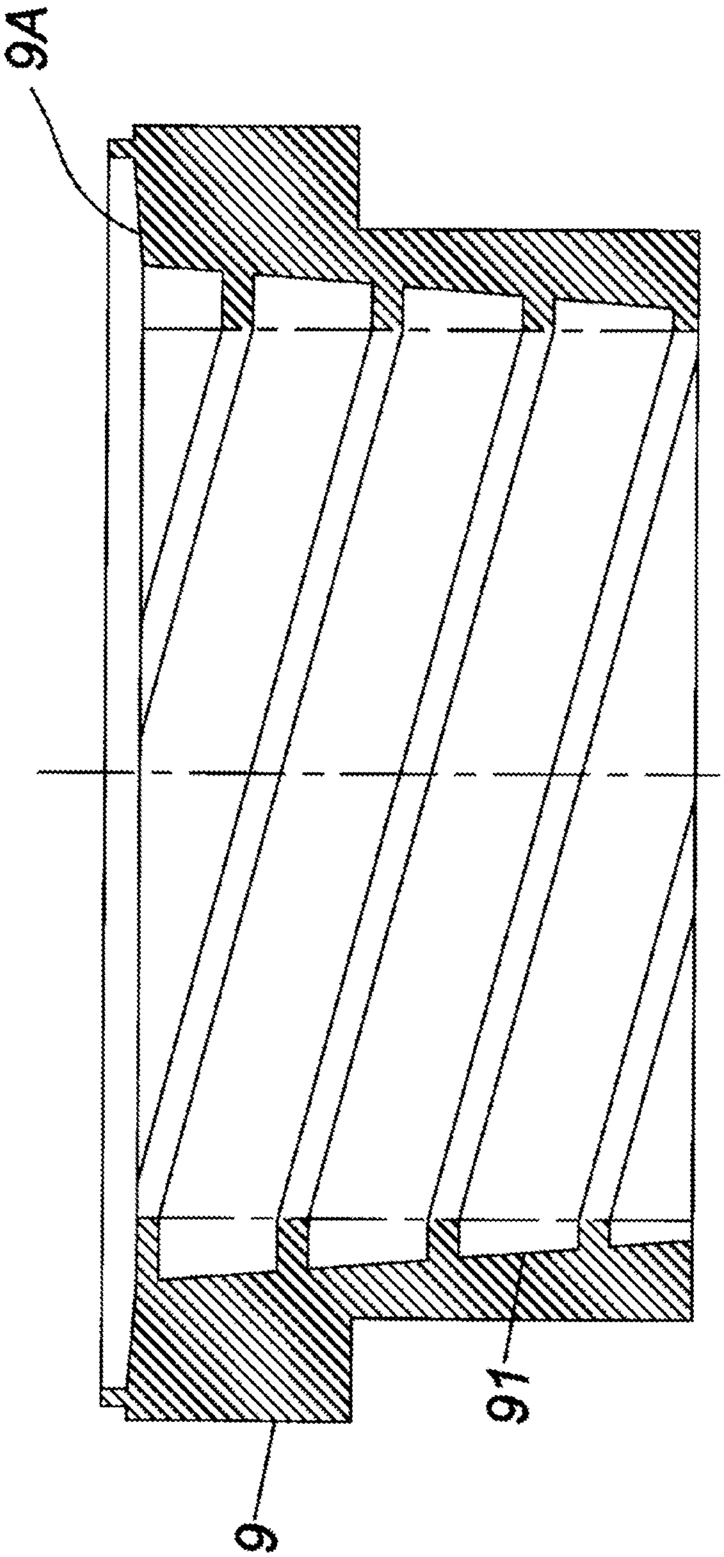
FIG. 2 is a cross-sectional view of a stator component configuring a thread groove pump portion in the vacuum pump of FIG. 1.

FIG. 1 is a cross-sectional view of a vacuum pump to which the present invention is applied, and FIG. 2 is a cross-sectional view of a stator component constituting a thread groove pump portion of the vacuum pump of FIG. 1.

Referring to FIG. 1, a vacuum pump P1 shown in the diagram includes a casing 1 having a cylindrical cross sectional shape, a cylindrical portion 6 (rotor) arranged inside the casing 1, a support means for supporting the cylindrical portion 6 rotatably, and a drive means for driving the cylindrical portion 6 to rotate.

The casing 1 has a bottomed cylindrical shape in which a tubular pump case 1A and a bottomed tubular pump base 1B are integrally coupled to each other by fastening bolts in a cylinder axis direction of the pump case 1A and the pump base 1B. An upper end potion of the pump case 1A is opened as an inlet port 2 for sucking gas, and a side surface of a lower end portion of the pump base 1B is provided with an outlet port 3 for exhausting the gas to the outside of the casing 1.

The inlet port 2 is connected to a vacuum chamber that creates a high vacuum, such as a process chamber of a semiconductor manufacturing apparatus, via a pressure adjustment valve, not shown. The outlet port 3 is connected in a communicating manner to an auxiliary pump, not shown.

A cylindrical stator column 4 containing various electrical components is provided in a central part of the pump case 1A. In the vacuum pump P1 of FIG. 1, the stator column 4 is formed as a separate component from the pump base 1B and screwed and fixed to an inner bottom of the pump base 1B. In this manner, the stator column 4 is provided upright on the pump base 1B. However, in another embodiment, the stator column 4 may be integrally provided upright on the inner bottom of the pump base 1B.

The cylindrical portion 6 described above is provided outside the stator column 4. The cylindrical portion 6 is in the shape of a cylinder enclosed in the pump case 1A and the pump base 1B and surrounding an outer periphery of the stator column 4.

A rotating shaft 5 (rotor shaft) is provided inside the stator column 4. The rotating shaft 5 is arranged in such a manner that an upper end portion of the same faces the inlet port 2 and a lower end portion thereof faces a bottom surface of the pump base 1B. The rotating shaft 5 is also rotatably supported by magnetic bearings (specifically, two sets of known radial magnetic bearings MB1 and one set of known axial magnetic bearings MB2). Furthermore, a drive motor MO is provided inside the stator column 4, and the rotating shaft 5 is driven by this drive motor MO to rotate about an axis of the rotating shaft 5.

The upper end portion of the rotating shaft 5 protrudes upward from a cylinder upper end surface of the stator column 4, and an upper end of the cylindrical portion 6 is integrally fixed to this protruding upper end portion of the rotating shaft 5 by fastening means such as bolts. The cylindrical portion 6, therefore, is rotatably supported by the magnetic bearings (the radial magnetic bearings MB1, the axial magnetic bearings MB2) via the rotating shaft 5. When the drive motor MO is started in this supported state, the cylindrical portion 6 can rotate integrally with the rotating shaft 5 around a rotation axis thereof. In other words, in the vacuum pump P1 shown in FIG. 1, the rotating shaft 5 and the magnetic bearings function as the support means for rotatably supporting the cylindrical portion 6, and the drive motor MO functions as the drive means for driving the cylindrical portion 6 to rotate.

In the vacuum pump P1 of FIG. 1, the upstream side from approximately the middle of the cylindrical portion 6 described above functions as a turbomolecular pump portion PT, and the downstream side of the turbomolecular pump portion PT, that is, the downstream side from approximately the middle of the cylindrical portion 6, functions as a thread groove pump portion PS. Configurations and exhaust operations of the turbomolecular pump portion PT and the thread groove pump portion PS are described hereinafter.

Configuration of Turbomolecular Pump Portion PT

A plurality of rotor blades 7 that rotates integrally with the cylindrical portion 6 are provided on an outer peripheral surface of the cylindrical portion 6 at the upstream side from approximately the middle of the cylindrical portion 6, and these rotor blades 7 are arranged radially at predetermined intervals around a rotation central axis of the cylindrical portion 6 (specifically, the axis of the rotating shaft 5) or an axis of the casing 1 (referred to as "vacuum pump axis," hereinafter).

On the inner peripheral side of the pump case 1A, on the other hand, a plurality of stator blades 8 are provided. These stator blades 8, too, are arranged radially at predetermined intervals around the vacuum pump axis, as with the rotor blades 7. A plurality of spacers S stacked along the direction of the vacuum pump axis are provided on the inner peripheral side of the pump case 1A, and the stator blades 8 are positioned and fixed at predetermined positions by these spacers S.

In the vacuum pump P1 shown in FIG. 1, the turbomolecular pump portion PT is configured by providing exhaust stages PT1 in multiple stages along the vacuum pump axis, the exhaust stages PT1 each being constituted by the plurality of rotor blades 7 and stator blades 8 arranged radially at predetermined intervals as described above.

In other words, the turbomolecular pump portion PT of the vacuum pump P1 in FIG. 1 includes the plurality of rotor blades 7 and stator blades 8 arranged radially at predetermined intervals, for each of the exhaust stages PT1, PT2, PTn, forming a gas exhaust structure for exhausting gas molecules.

Each of the rotor blades 7 is a blade-like cut product that is formed by cutting, integrally with an outer diameter treated portion of the cylindrical portion 6, and is inclined at an angle suitable for exhausting the gas molecules. Each of the stator blades 8 is also inclined at an angle suitable for exhausting the gas molecules.

Exhaust Operation by Turbomolecular Pump Portion PT

By starting the drive motor MO, in the exhaust stage PT1 at the top, the plurality of rotor blades 7 rotate at high speed integrally with the rotating shaft 5 and the cylindrical portion 6, and the inclined surfaces of the rotor blades 7 (specifically, the surfaces forward of the rotation direction and inclined downward (the direction from the inlet port 2 toward the outlet port 3, which is abbreviated as "downward," hereinafter)) impart a momentum in a downward tangential direction to the gas molecules introduced from the inlet port 2. The gas molecules with such momentum are sent to the subsequent exhaust stage PT2 by the inclined surfaces of the stator blades 8 (specifically, the surfaces inclined downward in a direction opposite to the rotation direction of the rotor blades 7).

In the subsequent exhaust stage PT2 and the following exhaust stages as well, as in the uppermost exhaust stage PT1, the rotor blade 7 impart the momentum to the gas molecules and the stator blades 8 send the gas molecules. As a result, the gas molecules in the vicinity of the inlet port 2 are exhausted so as to move sequentially toward the downstream of the cylindrical portion 6.

Configuration of Thread Groove Pump Portion PS

The thread groove pump portion PS has a thread groove pump portion stator 9 (see FIG. 2) as a means for forming a thread groove flow path R on the outer peripheral side of the cylindrical portion 6 (specifically, on the outer peripheral side of a part of the cylindrical portion 6 that is downstream of approximately the middle of the cylindrical portion 6). The thread groove pump portion stator 9 is mounted inside the casing 1 as a stator component of the thread groove pump portion PS.

The thread groove pump portion stator 9 is a cylindrical stator member having an inner peripheral surface facing the outer peripheral surface of the cylindrical portion 6. The thread groove pump portion stator 9 is arranged so as to surround the part of the cylindrical portion 6 that is downstream of approximately the middle of the cylindrical portion 6.

The part of the cylindrical portion 6 that is downstream of approximately the middle of the cylindrical portion 6 is a part rotating as a rotary component of the thread groove pump portion PS, and is inserted/housed in the thread groove pump portion stator 9, with a predetermined gap therebetween.

A thread groove 91 (see FIG. 2) in a tapered shape, the depth of which decreases as the thread groove extends downward, is formed in an inner peripheral portion of the thread groove pump portion stator 9. The thread groove 91 is formed in a spiral shape from an upper end of the thread groove pump portion stator 9 to a lower end of the same.

The thread groove flow path R for exhausting the gas is formed on the outer peripheral side of the cylindrical portion 6 by the thread groove pump portion stator 9 having the thread groove 91 described above. Although not shown, the thread groove flow path R described above may be provided by forming the thread groove 91 described above in the outer peripheral surface of the cylindrical portion 6.

In the thread groove pump portion PS, since the gas is transferred while being compressed by the thread groove 91 and the drag effect on the outer peripheral surface of the cylindrical portion 6, the depth of the thread groove 91 is set to be the deepest at the upstream entrance side of the thread groove flow path R (a flow path open end in the vicinity of the inlet port 2) and the shallowest at the downstream exit side of the same (a flow path open end in the vicinity of the outlet port 3).

The entrance of the thread groove flow path R (the upstream open end) is opened toward a gap between a stator blade 8E constituting the exhaust stage PTn at the bottom and the thread groove pump portion stator 9 (referred to as "last gap GE," hereinafter), whereas the exit of the thread groove flow path R (the downstream open end) is communicated with the outlet port 3 through an in-pump outlet port side flow path S.

By providing a predetermined gap between a lower end portion of the cylindrical portion 6 or the thread groove pump portion stator 9 and the inner bottom portion of the pump base 1B (a gap circling a lower outer periphery of the stator column 4, in the vacuum pump P1 shown in FIG. 1), the in-pump outlet port side flow path S is formed so as to extend from the exit of the thread groove flow path R to the outlet port 3.

Exhaust Operation in Thread Groove Pump Portion PS

The gas molecules that have reached the last gap GE by being transferred by the exhaust operation in the plurality of exhaust stages PT1, PT2, PTn described above are transferred to the thread groove flow path R. The transferred gas molecules move toward the in-pump outlet port side flow path S while being compressed from a transitional flow to a viscous flow by the drag effect generated by the rotation of the cylindrical portion 6 downstream of approximately the middle thereof. The gas molecules that have reached the in-pump outlet port side flow path S flow into the outlet port 3 and are exhausted to the outside of the casing 1 through the auxiliary pump, not shown.

Explanation of Bouncing of Particle and Bounce Back Prevention Means J

Figure 7:
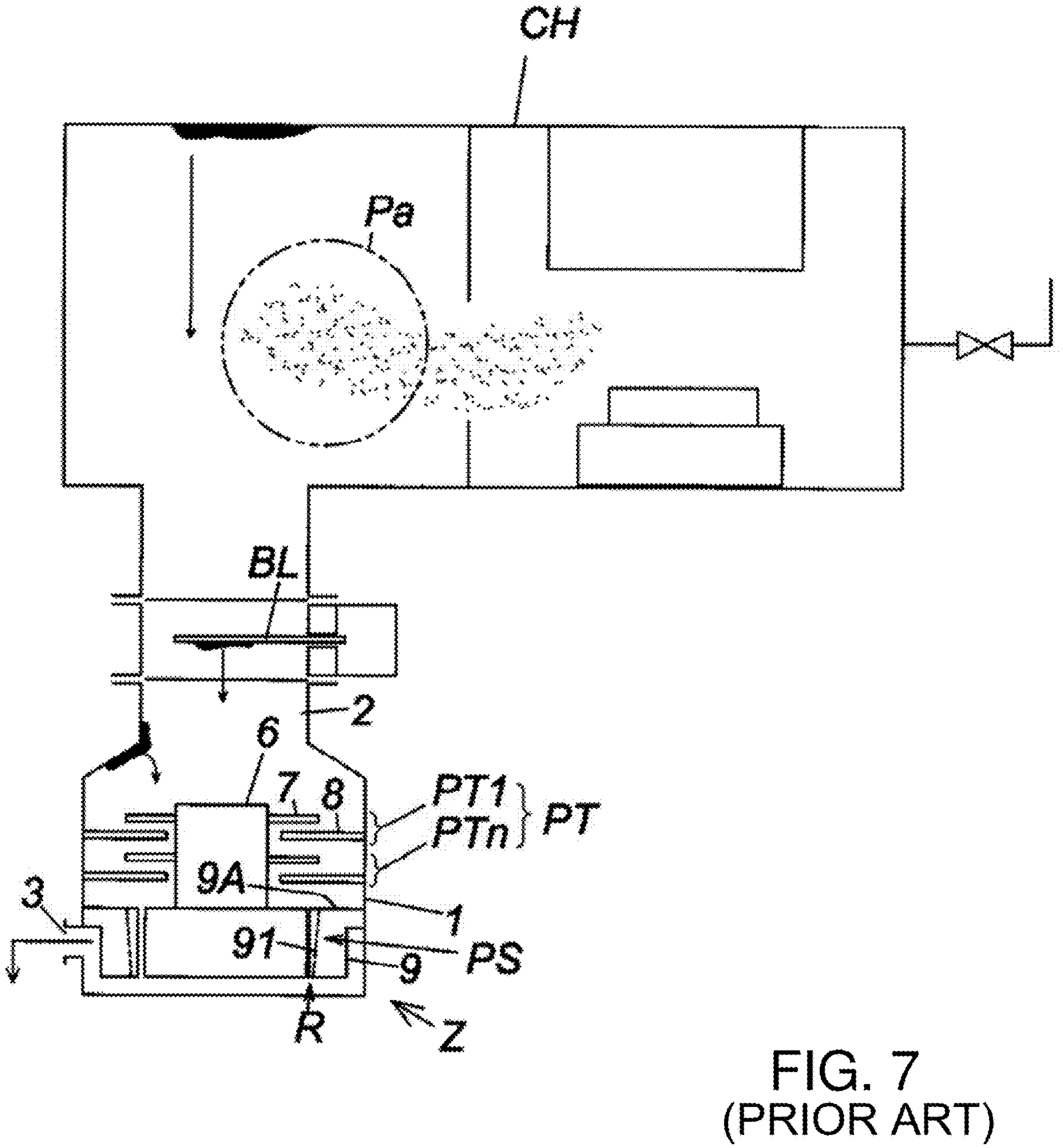
FIG. 7 (PRIOR ART)
FIG. 7 is a schematic view of an exhaust system in which a vacuum pump of prior art is employed as a gas exhaust means of a vacuum chamber.

Referring to FIG. 7, let it be assumed that fine-grained process by-products generated by a chemical process in a vacuum chamber CH float and diffuse in the vacuum chamber CH and fall toward the inlet port 2 of the vacuum pump P1 by the weight of said by-products or the transfer effect of the gas molecules. Furthermore, let it be assumed that sediments deposited on the inner wall surface of the vacuum chamber CH and sediments deposited on a pressure adjusting valve BL also peel off by vibrations or the like and fall toward the inlet port 2 of the vacuum pump P1 by the weight of the sediments. In addition, a particle Pa that have arrived at the inlet port 2 fall downstream of the cylindrical portion 6, that is, toward the last gap GE through the gas molecule exhaust flow paths of the turbomolecular pump portion PT formed by the gaps between the rotor blades 7 and the stator blades 8 and a gap G1 on the rotating structure that is provided between an outer end of each rotor blade 7 and the corresponding spacer S (referred to as "rotary gap G1 of the turbomolecular pump portion PT," hereinafter). The particle Pa that have reached the last gap GE by falling in this manner collide with an upper surface of the thread groove pump portion stator 9 (stator component) and bounce back from the thread groove pump portion PS toward the turbomolecular pump portion PT. Some of the particle Pa that have bounced as in this manner may flow back toward the vacuum chamber CH through the rotary gap G1 or the inlet port 2.

Accordingly, in order to prevent contamination of the vacuum chamber CH due to the backflow of the particle, in the vacuum pump P1 of FIG. 1, a bounce back prevention means J for preventing the particle from bouncing from the thread groove pump portion PS toward the turbomolecular pump portion PT is provided downstream of the turbomolecular pump portion PT.

Configuration Example of Bounce back Prevention Means J (1)

In a specific configuration example (1) of the bounce back prevention means J, in the vacuum pump P1 of FIG. 1, an upper surface 9A of the thread groove pump portion stator 9 (stator component) that faces the turbomolecular pump portion PT is configured to be inclined and smooth, that is, for example, as a smooth mirror surface, as illustrated in FIG. 2. This mirror surface may be formed by, for example, machining, such as polishing the upper surface 9A of the thread groove pump portion stator 9 (stator component). Alternatively, a plate body that has been mirror-finished in advance may be installed on the upper surface 9A of the thread groove pump portion stator 9 (stator component). The mirror surface may be formed by other methods.

In the vacuum pump P1 of FIG. 1, in order to facilitate the transfer of the particle Pa toward the thread groove flow path R by inclining the bouncing direction of the particle Pa toward the thread groove flow path R, the upper surface of the thread groove pump portion stator 9 (stator component) is configured to be an inclined surface having a downward slope toward an upstream end of the thread groove flow path R.

Figure 3A:
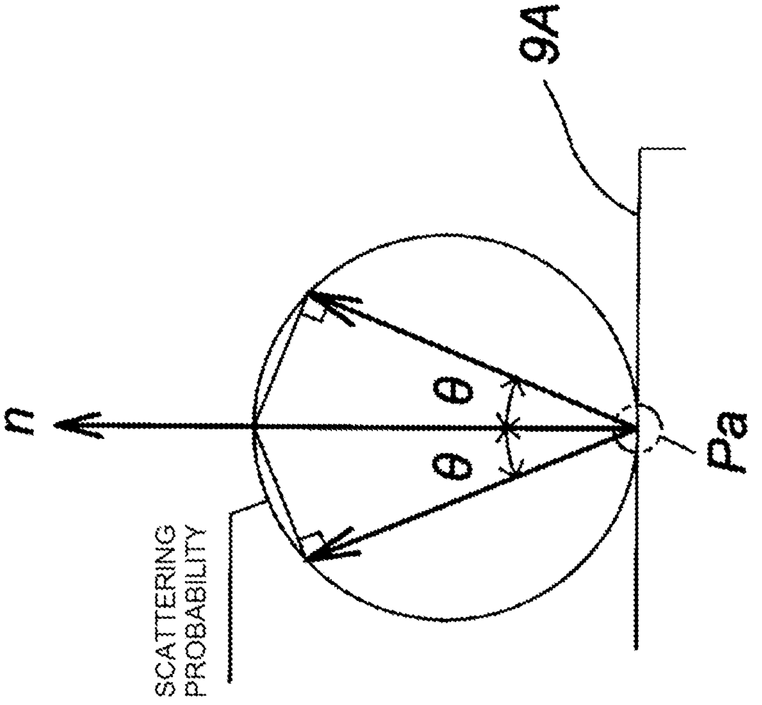
FIG. 3A is an explanatory diagram illustrating an ideal scattering probability of the particle bouncing back on an upper surface of a thread groove pump portion stator (stator component) that is not inclined.
Figure 3B:
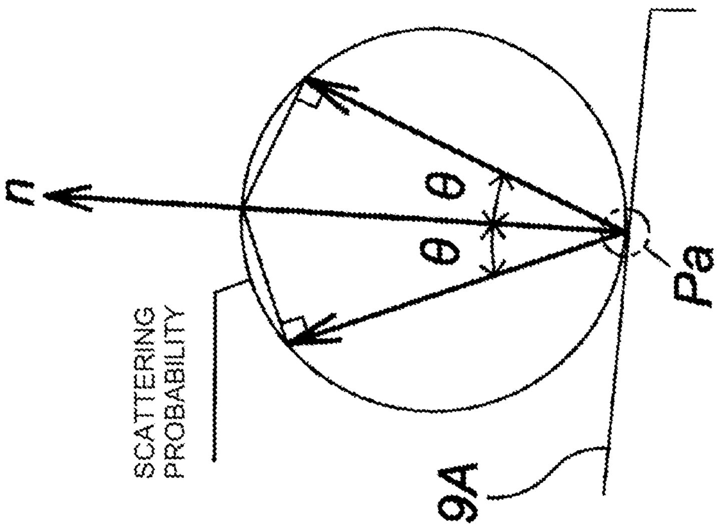
FIG. 3B is an explanatory diagram illustrating an ideal scattering probability of particle bouncing on the upper surface of the thread groove pump portion stator (stator component) that is inclined as in FIG. 1.

FIG. 3A is an explanatory diagram illustrating an ideal scattering probability of the particle bouncing back on an upper surface of a thread groove pump portion stator (stator component) that is not inclined. FIG. 3B is an explanatory diagram illustrating an ideal scattering probability of the particle bouncing on the upper surface of the thread groove pump portion stator (stator component) that is inclined as shown in FIG. 1.

As shown in FIGS. 3A and 3B, from the perspective of particle dynamics, the scattering of the particle Pa caused by the particle Pa bouncing on the upper surface 9A of the thread groove pump portion stator 9 (stator component) is closely related to a normal line n of the upper surface, and occurs in a range tilted by a predetermined angle θ from the normal line n (referred to as "particle scattering range," hereinafter).

Thus, in a case where the upper surface 9A of the thread groove pump portion stator 9 (stator component) is inclined as shown in FIG. 3B, since the normal line n of the upper surface 9A is inclined toward the upstream end of the thread groove flow path R, the scattering range of the particle Pa becomes closer to the upstream end of the thread groove flow path R. In other words, the particle Pa that bounces off the upper surface 9A has a stronger downward directivity (the direction opposite to the turbomolecular pump portion PT), facilitating the transfer of the particle Pa toward the thread groove flow path R.

Incidentally, if the size of the particle is, for example, $10^{-3}$ times that of the height difference of the unevenness caused by the surface roughness of the upper surface 9A of the thread groove pump portion stator 9 (stator component), that is, if the particle is sufficiently small relative to the surface roughness of the upper surface 9A, the particle that has collided with the upper surface is reflected irregularly in a range wider than the above-mentioned scattering range. Thus, the inclination of the upper surface 9A of the thread groove pump portion stator 9 (stator component) is not enough to sufficiently control the reflection direction of the particle; it is difficult to effectively prevent the particle from bouncing from the thread groove pump portion PS to the turbomolecular pump portion PT.

Accordingly, in the vacuum pump P1 of FIG. 1, the upper surface 9A of the thread groove pump portion stator 9 (stator component) that is inclined as described above is configured as a mirror surface. That is, the smoothness of the upper surface is enhanced to achieve a mirror-finish. As a result, the irregular reflection of the particle on the upper surface can be reduced, effectively preventing the particle from bouncing from the thread groove pump portion PS to the turbomolecular pump portion PT.

If the particle is sufficiently small relative to the surface roughness of the lower surface of the rotor blade 7 or stator blade 8 constituting the lowermost exhaust stage PTn (the surface of the thread groove pump portion PS that faces the upper surface 9A of the thread groove pump portion stator 9 (stator component)), the particle that has collided with the lower surface of the rotor blade 7 or stator blade 8 is also irregularly reflected in a range wider than the above-mentioned scattering range. Therefore, as a means for facilitating the transfer of the particle Pa toward the thread groove flow path R side by preventing the scattering of the particle caused by such irregular reflection, the lower surface of the rotor blade 7 or stator blade 8 constituting the lowermost exhaust stage PTn may be configured as the mirror surface.

For example, examples of the mirror finish include, but not limited to, a finishing process in which an arithmetic mean roughness Ra of the finishing mark in the JIS standard is 3.2 microns or less. More preferably, the finishing process achieves an arithmetic mean roughness Ra of 1.60 microns or less.

Configuration Example of Bounce Back Prevention Means J (2)

Figure 4:
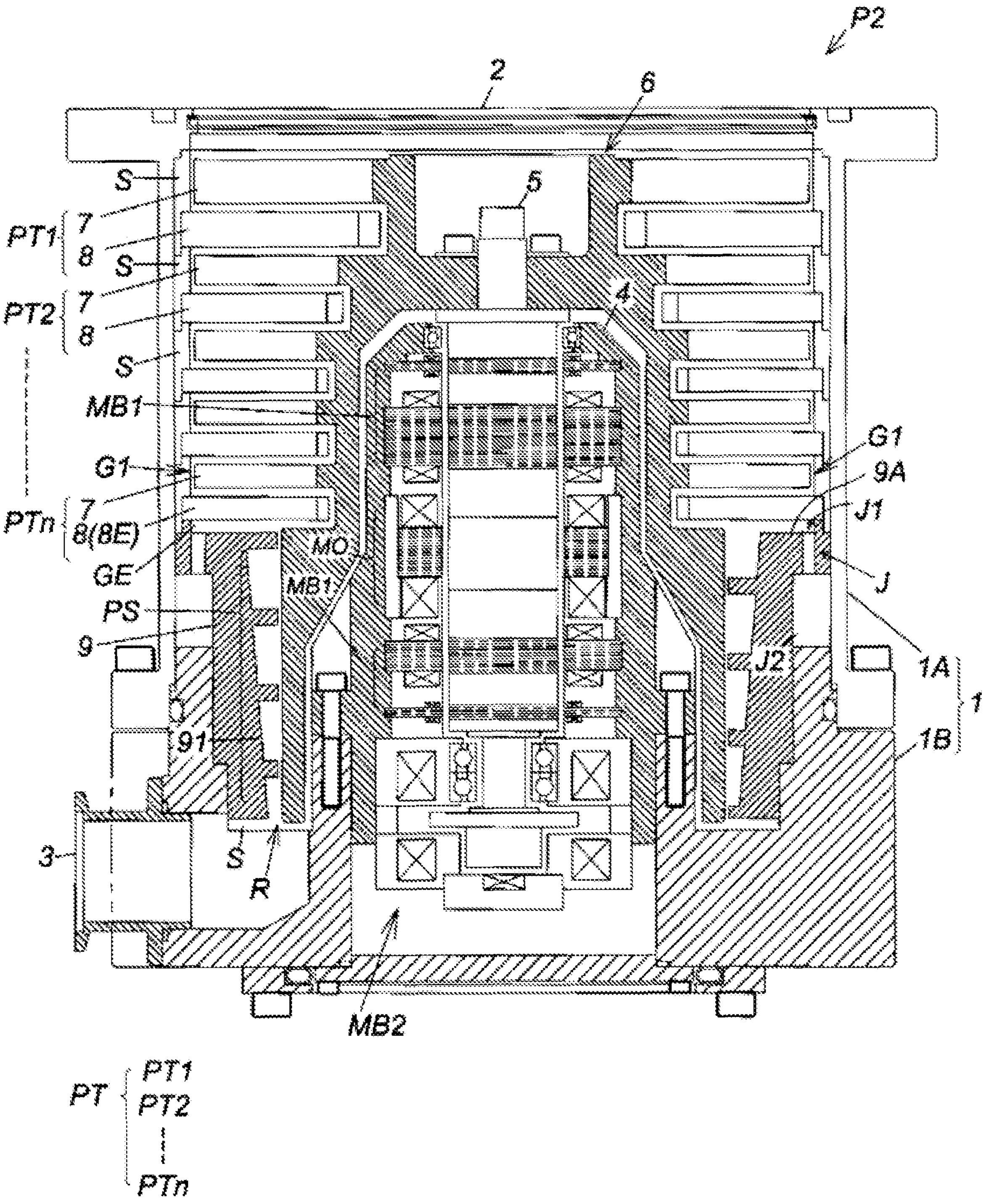
FIG. 4 is a cross-sectional view of the vacuum pump to which a configuration example (2) of a bounce back prevention means is applied.
Figure 5A:
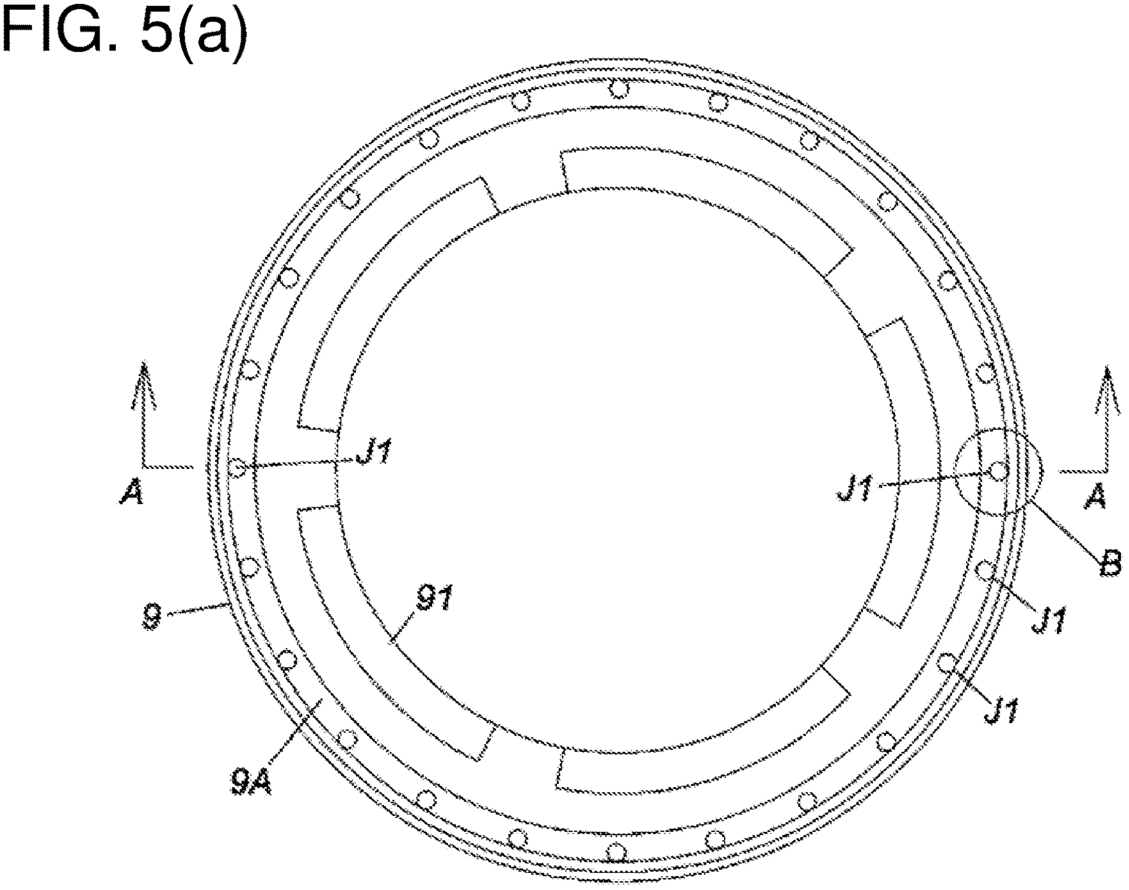
FIG. 5A is a top view of the stator component constituting the thread groove pump portion of the vacuum pump of FIG. 4.
Figure 5B:
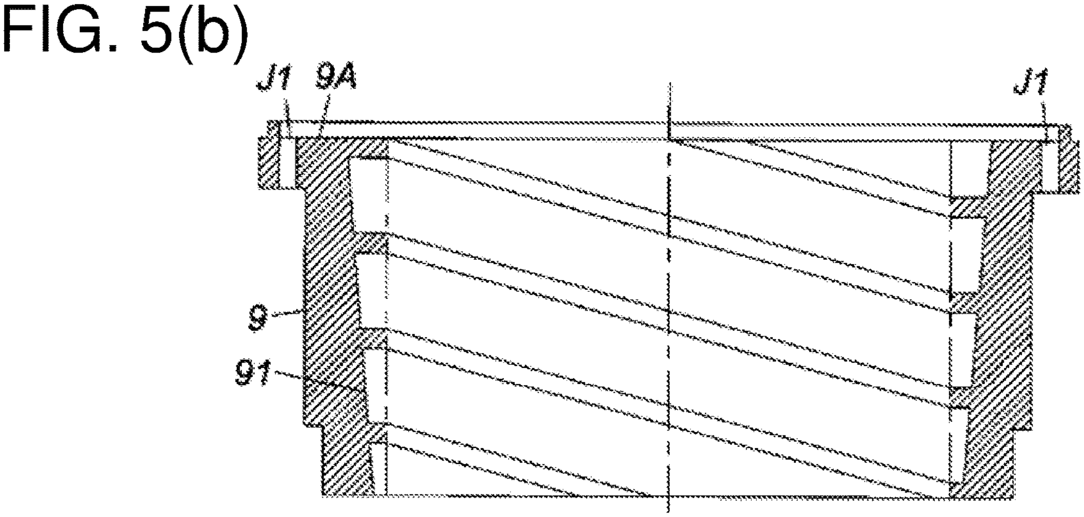
FIG. 5B is a cross-sectional view taken along an arrow A of FIG. 5A.

FIG. 4 is a cross-sectional view of the vacuum pump P2 to which a configuration example (2) of the bounce back prevention means is applied. FIG. 5A is a cross-sectional view of the stator component constituting the thread groove pump portion of the vacuum pump of FIG. 4. FIG. 5B is a cross-sectional view taken along an arrow A of FIG. 5A.

Since the basic configuration of the vacuum pump P2 of FIG. 4 is the same as that of the vacuum pump P1 of FIG.

1 described above, the members of the vacuum pump P2 of FIG. 4 that are identical to those of the vacuum pump P1 of FIG. 1 are denoted by the same reference numerals, and the detailed description thereof will be omitted.

In a configuration example (2) of the bounce back prevention means J, in the vacuum pump P2 of FIG. 4, an upper portion of the thread groove pump portion stator 9 (stator component) that faces the turbomolecular pump portion PT includes a recess portion J1 (see FIGS. 5A and 5B). The recess portion J1 functions as a space for capturing the particle near the upper surface 9A of the thread groove pump portion stator (stator component). Furthermore, referring to FIGS. 5A and 5B, the vacuum pump P2 in the diagrams is provided with a plurality of the recess portions J1.

Incidentally, as the number of particles Pa reaching the inlet port 2 increases, the number of particles near the upper surface of the thread groove pump portion stator 9 (stator component) increases accordingly. As a result, it is assumed that the particle is likely to scatter more easily near the upper surface of the thread groove pump portion stator 9 (stator component) due to the collision between particles, resulting in an increase in the number of particles that bounce back toward the turbomolecular pump portion PT.

In the vacuum pump P2 of FIG. 4, even if the number of particle Pa that have reached the inlet port 2 increases as described above, some particles in the vicinity of the upper surface of the thread groove pump portion stator 9 (stator component) enter the recess portion J1 and are captured by the recess portions J1. Thus, the scattering of the particles due to the collision therebetween as described above is reduced, and as a result, the number of particles that bounce back toward the turbomolecular pump portion PT is reduced.

As a specific configuration example of the recess portion J1, in the vacuum pump P2 of FIG. 4, the recess portion J1 is configured to penetrate the thread groove pump portion stator 9 (stator component). That is, the recess portion J1 has a structure in which the bottom thereof is removed so the recess portion J1 is communicated with and connected to a particle trapping space J2 different from the recess portion J1.

In addition, the recess portion J1 may include a smooth surface in at least a part of a surface of the recess portion J1. In a case where the recess portion J1 does not penetrate, that is, in a case where the recess portion J1 is composed of a side surface and a bottom surface, for example, when the side surface of the recess portion J1 is made smooth by mirror finishing or the like, and the roughness of the bottom surface of the recess portion J1 is made worse than the side surface, the effect of capturing a particle at the bottom surface and the effect of reducing kinetic energy can be improved.

In a case where the recess portion J1 is configured to penetrate as described above, if the side surface of the recess portion J1 is made smooth by mirror finishing or the like, the particle can be smoothly transferred to the particle trapping space J2.

As a specific configuration example of the particle trapping space J2, in the vacuum pump P2 of FIG. 4, by providing a predetermined gap between the upper portion of the pump base 1B and the thread groove pump portion stator 9 (stator component), the space surrounded by the upper surface of the pump base 1B, the inner surface of the pump case 1A, and the outer surface of the thread groove pump portion stator 9 (stator component) is employed as the particle trapping space J2; but the configuration is not limited thereto.

In the case of the configuration provided with the particle trapping space J2, the particle that has entered the recess portion J1 further enters the particle trapping space J2 and is captured by the particle trapping space J2, making it difficult for the particle to collide with each other in the recess portion J1. In that respect, the effect of the recess portion J1, that is, the effect of capturing the particle and thereby reducing the number of particles bouncing toward the turbomolecular pump portion PT, can be maintained for a long period of time.

Moreover, as a specific configuration example of the recess portion J1, in the vacuum pump P2 of FIG. 4, the recess portion J1 is configured to be located in a gap provided on the outer end side of the rotor blade 7, that is, near immediately below the rotary gap G1 of the turbomolecular pump portion PT.

Since many of the particles near the upper surface of the thread groove pump portion stator 9 (stator component) fall from the rotary gap G1 of the turbomolecular pump portion PT, the recess portion J1 is positioned near immediately below the rotary gap G1 as in the vacuum pump P2 of FIG. 4. Thus, the particle can be captured efficiently by the recess portion J1, and the effect of further reducing the number of particles bouncing toward of the turbomolecular pump portion PT can be expected.

The presence of the recess portion J1 near immediately below the rotary gap G1 ca reduce not only the area that contributes to the bouncing on the upper surface 9A of the thread groove pump portion stator (stator component), but also the area near immediately below the rotary gap G1 where many particles bounce back toward the inlet port 2 via the rotary gap G1 of the turbomolecular pump portion PT. Thus, the effect of further reducing the number of particles bouncing toward the turbomolecular pump portion PT can be expected.

Figure 6A:
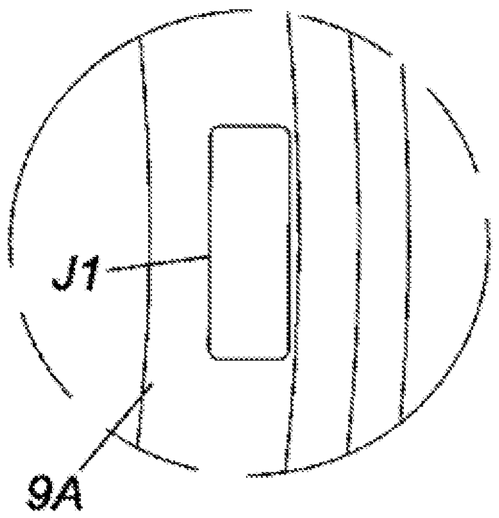
FIGS. 6A, 6B, and 6C are each a detailed drawing of part B shown in FIG. 5A.
Figure 6B:
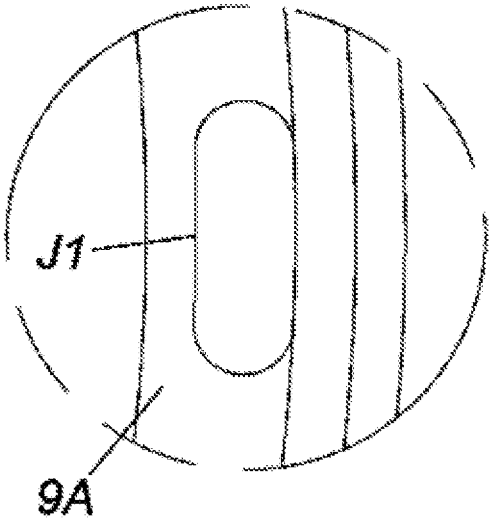
Figure 6C:
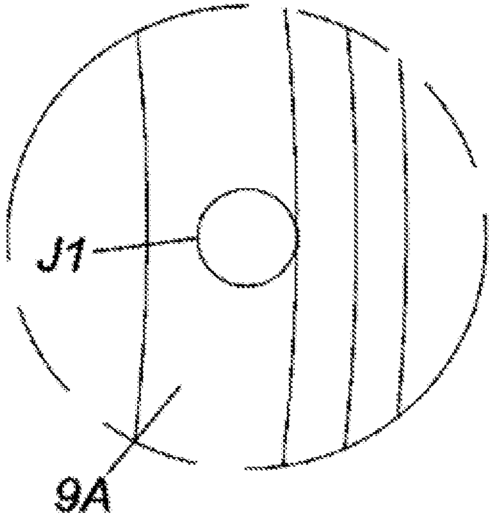

The cross-sectional shape of the recess portion, the number of recess portions, the arrangement configuration thereof and the like described above can be changed appropriately as needed. For example, the cross-sectional shape of the recess portion J1 can be a square hole cross-sectional shape as shown in FIG. 6A, a long hole cross-sectional shape as shown in FIG. 6B, or a round hole cross-sectional shape as shown in FIG. 6C. The number of recess portions J1 is not limited to the example shown in FIG. 5A and can be appropriately increased or decreased as needed. Also, the arrangement configuration of the recess portion J1 is not limited to the example shown in FIG. 5A and can be appropriately changed as needed.

Effects

In the vacuum pumps P1 and P2 of the embodiments described above, the bounce back prevention means J prevents the particle from bouncing from the thread groove pump portion PS toward the turbomolecular pump portion PT. Thus, the vacuum pumps P1 and P2 are suitable for preventing the backflow of the particle from the vacuum pumps P1 and P2 toward a vacuum chamber in terms of reducing the percentage of the bouncing particle flowing back toward the vacuum chamber upstream of the vacuum pumps P1 and P2.

The present invention is not limited to the foregoing embodiments, and many modifications can be made by those having ordinary knowledge in the art within the technical concept of the present invention.

For example, “Configuration Example of Bounce back Prevention Means (1)” and “Configuration Example of Bounce back Prevention Means (2)” described above may be appropriately combined and adopted as needed.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump, comprising:

a turbomolecular pump portion exhausting gas molecules by a rotor blade and a stator blade; and a thread groove pump portion provided downstream of the turbomolecular pump portion and exhausting the gas molecules by a thread groove flow path formed by a cylindrical rotary component and a cylindrical stator component provided on an outer periphery of the cylindrical rotary component, wherein a bounce back prevention means for preventing a particle from bouncing from the thread groove pump portion back toward the turbomolecular pump portion is provided on a surface of the stator component of the thread groove pump portion and comprises a recess in the surface, and the recess is connected to a particle trapping space separate from the thread groove flow path.

2. The vacuum pump according to claim 1, wherein the bounce back prevention means is characterized in that the surface is inclined and smooth.

3. The vacuum pump according to claim 1, wherein the recess is aligned with a gap provided on an outer end side of the rotor blade.

4. The vacuum pump according to claim 1, wherein the recess includes a smooth surface in at least a part of a surface of the recess.

5. A stator component of a thread groove pump portion of a vacuum pump, the stator component being provided downstream of a turbomolecular pump portion exhausting gas molecules by a rotor blade and a stator blade, and the stator component of the thread groove pump portion forming a thread groove flow path with a cylindrical rotary component to exhaust the gas molecules, wherein the stator component of the thread groove pump portion includes a bounce back prevention means for preventing a particle from bouncing from the thread groove pump portion back toward the turbomolecular pump portion, the bounce back prevention means comprising a recess in a surface of the stator component of the thread groove pump portion where the recess is separate from the thread groove flow path.

6. A vacuum pump, comprising:

a turbomolecular pump portion exhausting gas molecules by a rotor blade and a stator blade; and a thread groove pump portion provided downstream of the turbomolecular pump portion and exhausting the gas molecules by a thread groove flow path formed by a cylindrical rotary component and a cylindrical stator component provided on an outer periphery of the cylindrical rotary component, wherein a bounce back prevention means for preventing a particle peeling off after being deposited upstream of the turbomolecular pump portion, and falling from the turbomolecular pump portion towards the thread groove pump portion from bouncing from the thread groove pump portion back toward the turbomolecular pump portion is provided downstream of the turbomolecular pump portion, the bounce back prevention means has conical surface extending from an upstream end of the thread groove flow path on an upper surface of the stator component to a cylindrical wall extending in a direction parallel to a rotational central axis of the cylindrical rotary component, the conical surface being inclined with respect to a direction perpendicular to the rotation central axis of the cylindrical rotary component wherein an entirety of the conical surface is smooth, and an arithmetic mean roughness of the conical surface is 1.60 microns or less.

* * * * *